US012138655B2

(12) United States Patent
Raksha et al.

(10) Patent No.: US 12,138,655 B2
(45) Date of Patent: Nov. 12, 2024

(54) SYSTEM AND METHOD FOR FORMING AN IMAGE ON A SUBSTRATE

(71) Applicant: VIAVI Solutions Inc., San Jose, CA (US)

(72) Inventors: Vladimir P. Raksha, Santa Rosa, CA (US); Curtis R. Hruska, Windsor, CA (US); Neil Teitelbaum, Ottawa (CA)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/444,685

(22) Filed: Aug. 9, 2021

(65) Prior Publication Data

US 2021/0362186 A1 Nov. 25, 2021

Related U.S. Application Data

(60) Continuation of application No. 16/509,037, filed on Jul. 11, 2019, now Pat. No. 11,084,060, which is a
(Continued)

(51) Int. Cl.
*B05D 3/00* (2006.01)
*B05C 9/12* (2006.01)
(Continued)

(52) U.S. Cl.
CPC ................ *B05D 3/207* (2013.01); *B05C 9/12* (2013.01); *G03G 15/2007* (2013.01);
(Continued)

(58) Field of Classification Search
CPC ........ B05D 3/007; B05D 3/067; B05D 3/207; B05D 3/065; B05D 3/20; G03G 19/00;
(Continued)

(56) References Cited

U.S. PATENT DOCUMENTS 3,845,499 A 10/1974 Ballinger
4,158,862 A 6/1979 Michaud et al.
(Continued)

FOREIGN PATENT DOCUMENTS

EP 1857291 A2 11/2007
JP H06325358 A * 11/1994
JP H10154218 A * 6/1998

OTHER PUBLICATIONS

European Search Report for Application No. EP11195029, mailed on May 30, 2012, 4 pages.
(Continued)

*Primary Examiner* — Justin Seo
*Assistant Examiner* — Kendrick X Liu
(74) *Attorney, Agent, or Firm* — Harrity & Harrity, LLP

(57) ABSTRACT

A scanning laser having a wavelength compatible with a coating binder so as to cure it as the laser scans and irradiates the coating on a moving web. A system and method for curing flakes by providing a scanning laser which scans across a moving coated substrate in a magnetic field allows images to be formed as magnetically aligned flakes are cured into a fixed position. The images have regions of cured aligned flakes. The scanning laser cures the magnetically aligned flakes within it region it irradiates. Alternatively an array of lasers can be used wherein individual lasers can be switched on and off to fix irradiated coating as a moving web is moved at a high speed.

19 Claims, 5 Drawing Sheets

Related U.S. Application Data continuation of application No. 16/290,615, filed on Mar. 1, 2019, now Pat. No. 10,500,611, which is a continuation of application No. 15/260,283, filed on Sep. 8, 2016, now Pat. No. 10,226,790, which is a continuation of application No. 14/106,096, filed on Dec. 13, 2013, now abandoned, which is a division of application No. 13/336,688, filed on Dec. 23, 2011, now Pat. No. 8,633,954.

(60) Provisional application No. 61/427,319, filed on Dec. 27, 2010.

(51) Int. Cl.

| | |
|---|---|
| ***B05D 3/06*** | (2006.01) |
| ***B41J 2/44*** | (2006.01) |
| ***B41J 2/475*** | (2006.01) |
| ***B41J 11/00*** | (2006.01) |
| ***B41M 3/14*** | (2006.01) |
| ***G03G 15/20*** | (2006.01) |
| ***G03G 19/00*** | (2006.01) |

(52) U.S. Cl.
CPC ............... *G03G 19/00* (2013.01); *B41M 3/14* (2013.01); *G03G 2215/0013* (2013.01)

(58) Field of Classification Search
CPC . B41M 3/14; B41M 3/148; B41J 2/435; B41J 2/44; B41J 2/475; B41J 2/4753
See application file for complete search history.

(56) References Cited

U.S. PATENT DOCUMENTS 4,197,563 A 4/1980 Michaud
4,242,400 A * 12/1980 Smith .................... G03G 19/00 156/239
4,329,421 A * 5/1982 Wisnosky ............ B41M 7/0045 430/394
4,791,304 A 12/1988 Iida et al.
5,280,433 A 1/1994 Ettinger et al.
5,409,441 A 4/1995 Muscoplat et al.
5,855,969 A 1/1999 Robertson
5,981,053 A * 11/1999 Naylor ................... G11B 5/855 428/323
7,047,883 B2 5/2006 Raksha et al.
7,604,855 B2 10/2009 Raksha et al.
8,633,954 B2 1/2014 Raksha et al.
10,226,790 B2 * 3/2019 Raksha .................. G03G 19/00
10,500,611 B2 * 12/2019 Raksha .................. G03G 19/00
11,084,060 B2 * 8/2021 Raksha .................. B05D 3/207
2001/0052920 A1 * 12/2001 Matsumoto ........ B41J 11/00222 347/102
2002/0182383 A1 12/2002 Phillips et al.
2003/0131932 A1 7/2003 Hoult et al.
2004/0051297 A1 * 3/2004 Raksha ................... B41F 23/00 283/57
2005/0106367 A1 * 5/2005 Raksha .................... B41M 5/00 428/199
2006/0081151 A1 * 4/2006 Raksha .................. B41M 3/144 427/457
2006/0097515 A1 * 5/2006 Raksha .................. B41M 3/148 283/91
2006/0194040 A1 8/2006 Raksha et al.
2007/0023975 A1 2/2007 Buckley et al.
2007/0268349 A1 * 11/2007 Kurman ............... B41M 7/0027 347/102
2008/0024847 A1 1/2008 Kittler et al.
2008/0151951 A1 6/2008 Elliott et al.
2008/0211853 A1 9/2008 Nagashima et al.
2010/0144917 A1 * 6/2010 Sasa ..................... C07D 409/14 523/435
2010/0272961 A1 10/2010 Costin, Jr. et al.
2012/0241419 A1 * 9/2012 Rumsby ............... B23K 26/355 219/121.6
2014/0102363 A1 4/2014 Raksha et al.

OTHER PUBLICATIONS

Extended European Search Report for Application No. EP16168982, mailed on Apr. 26, 2017, 7 pages.
Merriam-Webster, Stationary, Merriam-Webster, 2017, 11 pages. Retrieved from Internert: [URL:https://www.merriam-webster.com/dictionary/stationary].

* cited by examiner

SYSTEM AND METHOD FOR FORMING AN IMAGE ON A SUBSTRATE

CROSS-REFERENCE TO RELATED APPLICATIONS

This application is a continuation of U.S. patent application Ser. No. 16/509,037, filed Jul. 11, 2019 (now U.S. Pat. No. 11,084,060), which is a continuation of U.S. patent application Ser. No. 16/290,615, filed Mar. 1, 2019 (now U.S. Pat. No. 10,500,611), which is a continuation of U.S. patent application Ser. No. 15/260,283, filed Sep. 8, 2016 (now U.S. Pat. No. 10,226,790), which is a continuation of U.S. patent application Ser. No. 14/106,096, filed Dec. 13, 2013, which is a divisional of U.S. patent application Ser. No. 13/336,688, filed Dec. 23, 2011 (now U.S. Pat. No. 8,633,954), which claims priority from U.S. Provisional Patent Application No. 61/427,319, filed Dec. 27, 2010, which are incorporated herein by reference for all purposes.

FIELD OF THE INVENTION

This invention relates generally to using a beam of light to selectively cure regions of a substrate coated with magnetically aligned pigment flakes within a binder.

BACKGROUND OF THE INVENTION

Optically variable devices are used in a wide variety of applications, both decorative and utilitarian. These devices can be made in variety of ways to achieve a variety of effects. Examples of optically variable devices include the holograms imprinted on credit cards and authentic software documentation, color-shifting images printed on banknotes, and enhancing the surface appearance of items such as motorcycle helmets and wheel covers.

Optically variable devices can be made as film or foil that is pressed, stamped, glued, or otherwise attached to an object, and can also be made using optically variable pigments. One type of optically variable pigment is commonly called a color-shifting pigment because the apparent color of images appropriately printed with such pigments changes as the angle of view and/or illumination is tilted. A common example is the “20” printed with color-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image, printed with color-shifting pigment, might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments that are aligned with a magnetic field after applying the pigment, typically in a carrier such as an ink vehicle or a paint vehicle, to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing of a pattern of flaked magnetic particles in fluoropolymer matrix has been described. After coating a product with a composition in liquid form, a magnet with desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating. Although it is more common to align magnetic flakes, dielectric flakes can also be aligned in a similar manner to magnetic flakes by placing the dielectric flakes in an electric field.

While these approaches describe methods and apparatus for formation of three-dimensional-like images in paint layers, they are not suitable for high-speed printing processes because they are essentially batch processes. It is desirable to provide methods and apparatus for a high-speed in-line printing and painting that re-orients magnetic pigment flakes. It is further desirable to create more noticeable optically variable security features on financial documents and other products.

U.S. Pat. No. 7,047,883 in the name of Raksha et al., incorporated herein by reference, discloses a method and apparatus for orienting magnetic flakes. In this patent a high-speed system is disclosed wherein flakes in a UV curable binder on a moving web are aligned and subsequently cured using a UV-light source. In a particular embodiment this patent describes fixing the flakes before they pass over the trailing edge of the magnet by providing a UV source part way down the run of the magnet, for UV-curing carrier, or a drying source for evaporative carriers, for example. The drier disclosed within U.S. Pat. No. 7,047,883 incorporated herein by reference, is heater, for example, or in the instance that the ink or paint is a UV-curable, a UV lamp is used to cure the ink or paint. In another United States patent to Argoitia et al., UV curable ink or paint was disclosed and a UV lamp was used to cure magnetically aligned flakes within the ink or paint. U.S. Pat. No. 7,604,855 incorporated herein by reference also teaches that it is preferable to cure aligned flakes before leaving the trailing edge of a magnet on a moving substrate. Heretofore, large UV lamps have been used to cure magnetically aligned flakes in a UV curable binder. While these heaters and UV lamps serve an intended purpose, they are bulky and do not provide a way in which flakes in a binder within adjacent regions can be selectively cured.

It is an object of this invention to provide a method whereby high-speed inline printing and or painting that reorients magnetic flakes in a selected region and preserves their orientation is achieved while a web or substrate is moved at a relatively high speed to provide an optically variable device. The flakes which are oriented by the magnetic field are in a region that may form indicia such as a logo or the like, or may be surrounding indicia to highlight indicia on the substrate.

It is an object of this invention to provide in a preferred embodiment two distinct visible regions of aligned flakes wherein the alignment in each of the two regions is different from the other.

It is an object of this invention to first cure a first group of flakes with a moving laser beam and then to use other means for curing a remaining portion of flakes adjacent to the first group on a substrate.

SUMMARY OF THE INVENTION

In accordance with the invention, a method of forming an image on a substrate, is provided comprising the steps of:

- applying a coating of flakes within a binder to a first region of the substrate, wherein at least some of the flakes within the coating are alignable in an applied magnetic or electric field;
- moving the substrate at the speed of at least 25 ft/min and applying a magnetic or electric field so as to orient at least some of the flakes within the coating;
- while the first region of the substrate is moving in a first downstream direction; and, irradiating with one or more laser beams in one or more sub-regions of the first region of aligned flakes so as to cure the binder and maintain alignment of flakes within the one or more sub-regions, wherein the one or more laser beams irradiate a plurality of locations on the substrate along a direction across the downstream direction, wherein lines of flakes across the substrate are cured in succession as the substrate is moving and wherein the length of the lines varies in a predetermined manner so as to form an image.

In a particular embodiment the method also provides for one of the one or more laser beams being swept across the substrate in a direction substantially transverse to the downstream direction, curing the coating along a path it sweeps, wherein the field is a magnetic field and wherein the laser beam swept across the substrate irradiates the coating within the magnetic field, and or, wherein the one or more laser beams includes a laser beam that irradiates the coating as a focused spot or defocused spot, or a line, wherein said line is transverse to the downstream direction and wherein the step of irradiating the one or more sub-regions results in the curing the coating in a predetermined pattern so as to provide a permanent visible image upon the substrate such as a logo, or text or symbol.

In a preferred embodiment the coating of flakes within the binder in the first region and outside of the one or more sub-regions irradiated by the laser beam are aligned by a second magnetic field and subsequently cured after the coating of flakes in the one or more sub-regions are cured by laser beam.

This embodiment also allows the one or more lasers to be programmed so as to print different images or indicia on subsequent labels being printed in this high-speed process by controlling the output of particular lasers as is required. Therefore the pattern of flakes that is cured, i.e. the particular region of flakes being cured can be varied from label to label by switching on lasers to achieve curing in a desired region corresponding to the indica.

In accordance with another aspect of the invention, a system is provided for coating a substrate comprising:

- a station for moving a substrate at a speed of at least 25 ft/sec along a path;
- a coater for coating the substrate with a plurality of coating regions each coating region for forming a separate image, each coating region including magnetically alignable flakes within a binder;
- a first magnetic field generator positioned about a portion of the path for generating a first magnetic field for aligning magnetically alignable flakes within a each coating region as the substrate moves along the path; and,
- one or more lasers for providing one or more laser beams; and,
- a controller for controlling the one or more lasers to irradiate a plurality of locations on the substrate along a direction across the downstream direction so as to cure lines of the coating across the substrate in succession as the substrate is moving and wherein the length of the lines varies in a predetermined manner so as to form an image.

The one or more lasers may include a laser having a beam that is moved to a plurality of positions across the path of moving substrate to cure the binder. In a particular embodiment the laser is a scanning laser programmed so as to irradiate a coating region while the coating region is in the first magnetic field so as to at least partially cure the flakes in that coating region before the flakes exit the first magnetic field.

In a preferred embodiment the system further includes a second magnetic field generator disposed downstream from the first magnetic field generator and along the path for magnetically aligning flakes outside of the portion of each coating region cured by the scanning laser; and, a curing station for curing binder so as to maintain alignment of magnetically alignable flakes aligned by the second magnetic field generator. A motor is provided for moving the substrate at a speed of 25 to 400 feet per minute while the one or more lasers irradiate the coating.

In yet another embodiment the one or more lasers comprise an array lasers positioned to irradiate the substrate and cure the coating along a line across the path and the array of lasers are controlled by the controller such that one or more lasers are switched on, while others are switched off, dynamically, wherein the switching on and off is controlled by a suitably programmed processor, thereby forming an image by curing portions of the coating that are irradiated by lasers that are switched on as the substrate moves along the path. Preferably the one or more lasers includes a laser having a wavelength in the range of 325 nm to 425 nm, and wherein said laser has a power in the range of 100 mW to 2000 mW In one preferred embodiment the laser is a scanning laser programmed so as to irradiate a coating region while said coating region is in the first magnetic field so as to at least partially cure the flakes in that coating region before the flakes exit the first magnetic field.

In another preferred embodiment the one or more lasers are in the form of an array lasers that can be switched on and off individually, positioned to irradiate the substrate and cure the coating along a line across the path. The lasers on and off pattern is changed dynamically by a processor executing suitably programmed software, wherein the switching on and off as the substrate is moving forms an image by curing portions of the coating that are irradiated by lasers that are switched on as the substrate moves along the path.

BRIEF DESCRIPTION OF THE DRAWINGS

Exemplary embodiments of the invention will now be described in conjunction with the drawings in which.

DETAILED DESCRIPTION

This invention provides a high-speed system and method for applying field-alignable flakes in ink or paint to a substrate in a plurality of regions and for aligning flakes within a region, and in-situ, while the flakes are aligned within an applied field such as a magnetic field, freezing those flakes in their magnetically aligned position by writing an image in the wet magnetic ink with an ultra-violet (UV) laser beam. Ink that is not exposed to the UV beam is not cured and flakes within this ink are not fixed in their aligned position and only flakes that have been written or cured in their clear or tinted ink or paint carrier with the UV beam are cured and fixed in their aligned position as UV curing binder solidifies. This system and method provides selective curing of locations within the wet ink as the substrate passes through the magnetic field at speeds of 25 ft/min and even up to speeds of 400 ft/min or greater.

There are several aspects, which make this system a significant advance in the field of coating images. It offers selective curing of particular regions of flakes in binder as the coated substrate is moving at high speed through a magnetic field. It offers the benefit of freezing flakes in their aligned position before the flakes exit the magnetic field; by way of example, a fine laser beam can be directed to a wet coated region between at least a pair of magnets so as to freeze aligned flakes in their position by curing the binder they are in. This is important as aligned flakes in uncured binder exiting an applied field often become disoriented and lose their intended alignment. Furthermore the invention provides a scanning laser that writes a UV beam across the substrate. Because the laser beam moves in a different direction along a path nearly orthogonal to the direction the substrate is travelling, this allows virtually any design to be created and the aligned flakes within that design cured within the binder or carrier are frozen in place. Yet still further, this system allows flakes that were not cured outside of a the region written by the UV laser, to be realigned by a second different magnetic field down stream and subsequently cured in different alignment, providing a contrast between the first aligned cured flakes and the second aligned cured flakes. Aspects of the invention will now be described in greater detail.

Figure 1:
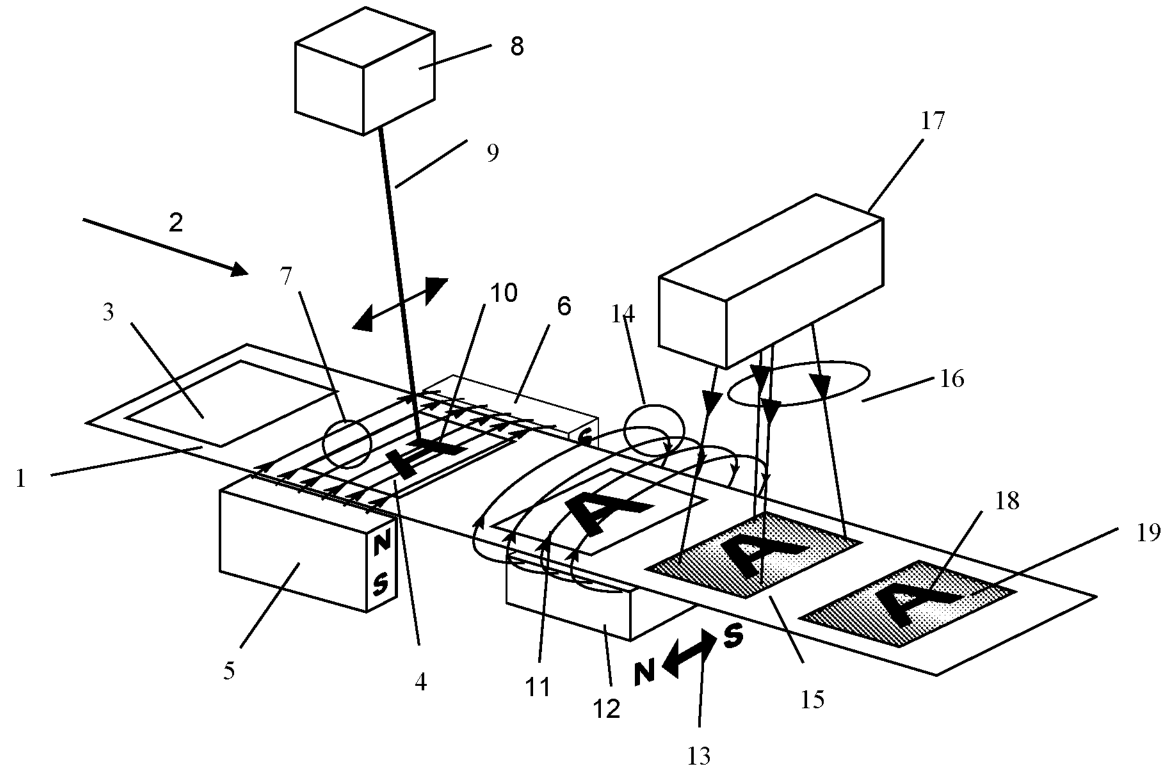
FIG. 1 is an isometric drawing of a high-speed system for aligning and curing flakes coated on a web having two alignment stations and two curing stations.

Turning now to FIG. 1 a system is shown having a flexible substrate 1 moving in a direction 2 at a controlled speed of approximately 25 ft/min to 400 ft/min. The speed can be increased or decreased. Of course if the substrate is moving at too great a speed, the UV laser will not be able to fully cure flakes within a desire region defining the letter A on the substrate. Writing or curing occurs by a curing of the UV-curable ink vehicle by the scanning beam of the ultra violet laser 8. The beam 9 is moved in the direction perpendicular to the direction 2 of the continuously moving substrate as shown. The region 3 on the web is coated in a printer press (not shown in this figure) with UV-curable magnetic ink containing platelets of a magnetic pigment. The pigment can be any magnetic pigment including metallic, color-shifting or micro-structured pigments. The ink vehicle can be clear or dyed. When the printed region 3 is advanced to location 4 between two permanent magnets 5 and 6, magnetic platelets of the pigment become oriented along magnetic lines 7 of the field. The UV-laser 8 generates the beam 9 of light. The beam scans forth-and-back the region 10 in the direction across the substrate. The amplitude of the scan depends on the graphics of an image. The ink vehicle cures in the places where the beam 9 illuminates it. Magnetic platelets are fixed in their positions with respect to the surface of the coated insignia 3. The scanning of the beam is controlled by a computer (not shown in FIG. 1) linked to the printing press. The computer provides writing of a predetermined image 10 of "A" in the coated area 4 and the registration of this image in the margins of the coated area 4 by controlling the speed of the substrate and the amplitude of scanning. Thus, the computer provides the function of a controller.

The insignia "A" coated on the substrate is formed by continuously moving substrate 1 downstream to the position 11 into the magnetic field of different configuration while the laser beam irradiates and cures the clear or tinted ink or paint while scanning. Of course the laser 8 can be preprogrammed to sweep in any number of ways so as to generate virtually any image. The second magnetic field 14 is created by the magnet 12 of the polarity 13. The magnet 12 generates a field with magnetic lines 14. Magnetic platelets dispersed in the remaining layer of non-cured wet ink align themselves in a direction forming a linear convex Fresnel array reflector.

After the insignia is formed and cured by the laser 8, it is moved downstream in a later moment in time to the position 15 where the wet ink about the "A" becomes cured by rays 16 of UV light coming from the UV lamp 17. The image now consists of the bright image 18 of the letter "A" illusively floating on the top of a dynamic background 19 having appearance of a cylindrical surface as a result of the second magnetic field 14.

Figure 2:
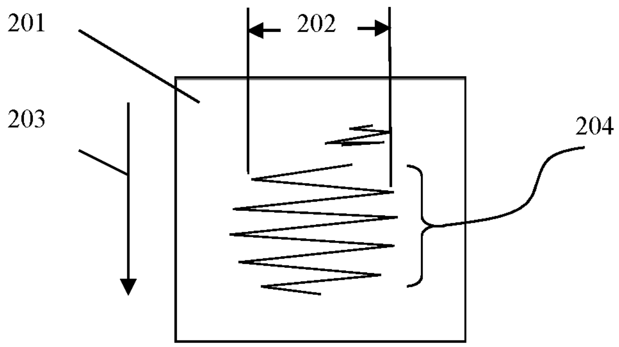
FIG. 2 is illustrates the path of a scanning laser that is used for curing flakes on a moving web
Figure 3:
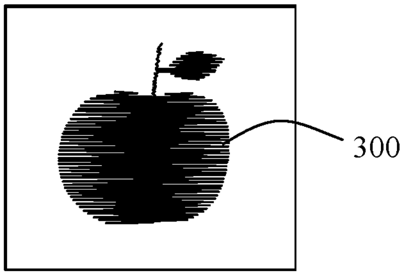
FIG. 3 shows an image formed by using the scanning laser programmed to scan across a moving substrate to create an apple logo.

Further details of the scanning/writing process will now be described. The Laser beam 9 scans or sweeps the layer of wet ink with the frequency determined by the speed of the substrate and the amplitude determined by the graphics of the image as illustrated in FIGS. 2 and 3. The laser beam (not shown in FIG. 2), scanning from the left to the right with the variable amplitude 202 perpendicularly to the layer of wet ink 201 is moved at a high speed in the direction 203 in the plane of the page. The scanning light of the laser 8 locally cured the ink creating the snake-like or tight zigzag path of the beam 204 at the particular speed of the substrate. Reduction of the speed of the substrate changes the path creating an image of an apple at the same amplitude of the beam scanning across the wet ink 201 as is illustrated in FIG. 3. This zigzag path is essentially transverse to the direction in which the substrate moves.

In FIG. 2 each scanned line has a predetermined length, determined by the laser's scan back and forth. For the purposes of understanding this invention, the continuous zigzag snake-like line consistent with the path 204 taken by the laser, in effect provides nine successive lines, wherein the length of some of these lines vary to create a visible pattern or logo. Therefore the laser is programmed to scan across the moving substrate and cure lines of flakes, one after another, successively to form the zigzag pattern shown. The lines formed across the moving substrate are at an angle and the steepness of the angle is dependent upon the speed at which the substrate is moving. Thus, locations across the substrate in a direction across the downstream direction are cured in this manner.

Referring to FIG. 3 an image of an apple 300 is shown formed by a laser having a beam directed in a predetermined zigzag pattern in a manner as shown in FIG. 2.

Although scanning or sweeping of the laser beam is shown to be done in a single continuous sweep back and forth, the laser can be switched on and off during a single sweep across so as to create a broken line or even a dashed line, by pulsing the laser accordingly.

Figure 4:
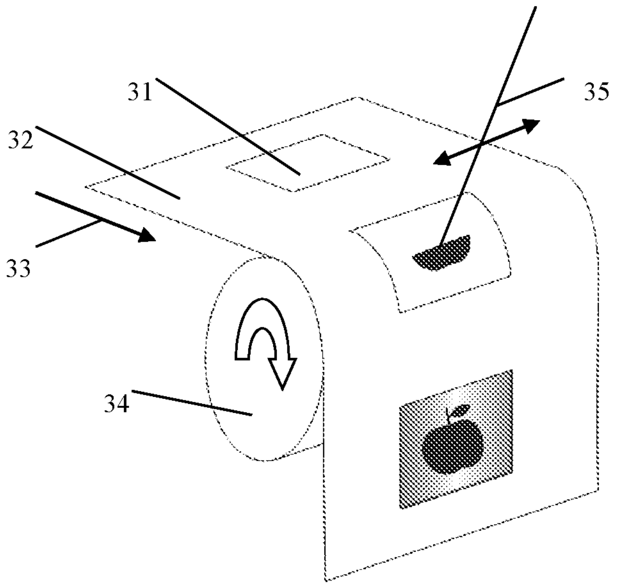
FIG. 4 depicts an alternative embodiment wherein a roller having magnets therein align flakes while a laser writes/cures flakes forming the apple logo.

Direct writing with the laser beam is particularly advantageous for the substrate moving around a cylinder containing embedded magnets for a formation of a magnetic field as shown in FIG. 4. The layer 31 of wet ink is coated onto the substrate 32 moving in the direction 33. The substrate is wrapped around the cylinder 34 containing imbedded or engraved magnets not shown in FIG. 4. Laser beam 35 scans the layer of the ink with the frequency determined by the speed of the substrate and the amplitude determined by the graphics of the image.

For security applications, images may be produced by a UV laser whose beam has passed through an interchangeable beam shaping optic. This optic transforms the existing laser beam into various patterns. Theses patterns will then locally cure the UV curable binder in which the magnetic pigment is encapsulated. These patterns may be in the form of line boarders, lines within images, dot matrix's, wordage, or any type of image. The benefit is that the patterns can be imprinted at high speeds and in high definition. The beam shaping optic can be rotated and or translated to create highly complex patterns that creating the effect of having an even greater depth of field. Patterns can be printed before, during or, to a lesser degree, after the magnetic flakes have been affected by magnets.

A UV laser maybe used to create complex patterns or patterns comprising of different resolvable feature. In addition, laser light creates an additional "degree of freedom" by enabling multiple alignments of the magnetic flakes for each printing process. This is achieved by changing the magnetic pigment orientation between each UV laser exposure to the laser writing process or between exposures between the laser writing process and the conventional curing that can take place subsequent to the laser writing as is shown in FIG. 1. This extra "degree of freedom" created by multiple flake orientation technique may create highly diverse and unique security image features.

Using a laser to cure flakes within a binder has numerous advantages as described above. It allows selective curing while a substrate is moving through a magnetic field. However there are further advantages. Magnetic devices currently being developed for the alignment of magnetic particles are becoming more and more complicated. In some instances the magnetic assembly may consist of two or more housings containing magnetic assemblies and located on one or both sides of a fast moving paper or plastic substrate with very tight spaces between these housings. As was mentioned heretofore, it is desired to cure flakes subjected to a magnetic field while the flakes are still within the field, for example between the magnets. Notwithstanding, this is often very difficult, and at times impossible to cure the flakes in the binder using a conventional arc or ultraviolet LED lamp through a very narrow gap between the magnetic assemblies. Only narrow focused and long distance directing of a laser beam is able to cure the ink in such tight spaces. Thus it is desirable to have a sweeping laser beam or multiple beams for creating a variable length line for some applications.

However in other instances a very narrow window in the form of a line is available and scanning along the line as the substrate is moving at a high speed is not possible.

Figure 5:
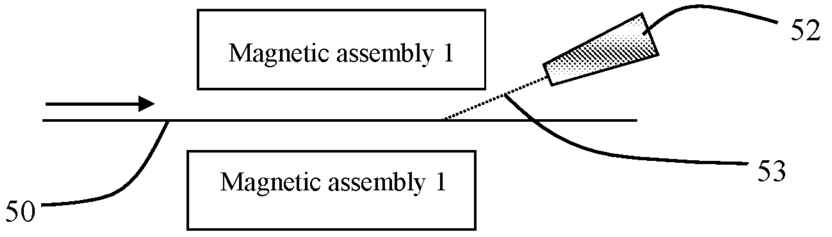
FIG. 5 is a diagram showing two magnets on either side of the substrate with a laser directed at an angle irradiating the substrate so as to cure the coating there upon.
Figure 6:
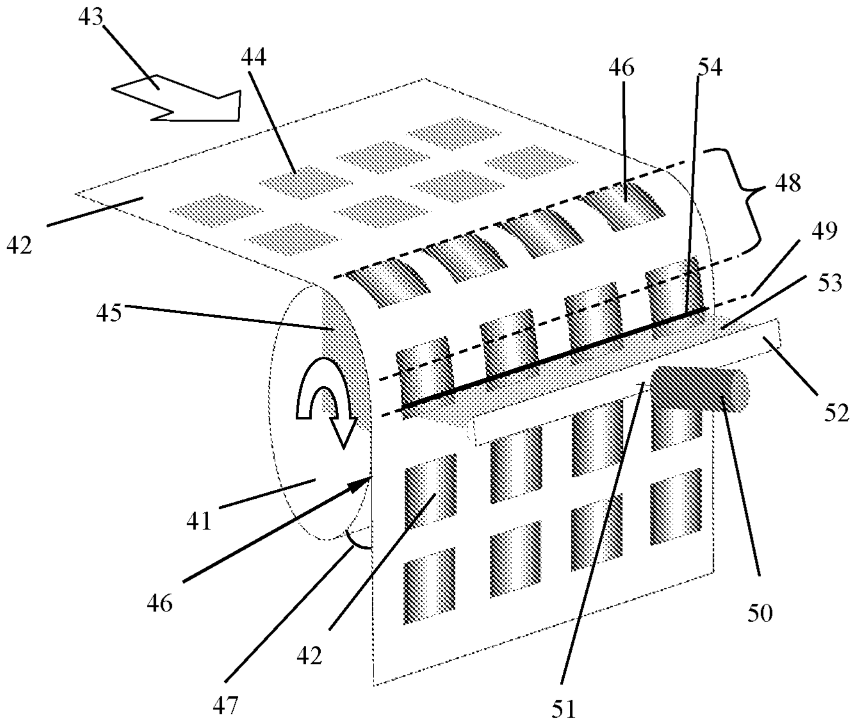
FIG. 6 is a diagram showing an alternative embodiment of the invention where an optic is used to convert a spot beam to a line across the substrate for curing coating on a moving web.

FIGS. 5 and 6 illustrate an embodiment of the invention wherein a UV laser beam is converted to a line of light that is focused within a very narrow window corresponding to the width of the substrate available to irradiate the moving substrate and cure the ink while still in the magnetic field. Turning now to FIG. 5 a magnetic assembly 1 is shown on either side of the substrate 50, which moves in a direction of the arrow shown. A laser 52 provides a beam 53 which is directed so as to irradiate the coated substrate while a coating between the magnets is in the magnetic field, not shown. FIG. 5 is illustrative of the fact that by using a narrow laser beam the substrate can be cured while in the magnetic field, where in the past a large UV lamp would have been used after the coating exited the magnetic field. By using a narrow width beam it is possible it launch and direct the beam into a very narrow available window in which to cure the coating.

Turning now to FIG. 6, a magnetic cylinder 41, containing embedded magnets for aligning of magnetic particles, was mounted on the printing press. In operation, the flexible substrate 42 moves in the direction 43. The substrate 42 has regions 44 of wet ink on its surface printed with magnetic ink at the print station of the press, not shown in the figure. The flexible substrate 42 bends around the magnetic cylinder 41 contacting one quadrant 45 of its surface. The printed regions 44 on the substrate are registered with the magnets of the cylinder 41 aligning magnetic particles and forming the "rolling bar" feature 46, disclosed in for example U.S. Pat. No. 7,604,855. Alignment of platelets occurs in the margins of the quadrant 45. If magnetic ink with aligned magnetic particles is not cured in the margins of the quadrant 45, they begin to re-align and lose the "rolling bar" effect in the location 46 where the web 42 starts to separate from cylinder 41. Such unwanted re-alignment occurs because magnetic particles follow direction of magnetic field that continues to change with the growth of a distance between the substrate 42 and the cylinder 41 in the margins of the angle 47. It would make sense to let the particles become aligned along the region 48 of the substrate 42 over the quadrant 45 where they could be aligned properly, and cured in the portion 49 of the substrate that is close to the end of the quadrant.

To prevent the loss of the desired magnetic alignment effect, magnetic particles should be cured in the field. If conventional mercury lamps or UV LED light sources illuminate the cylinder 1, they have to illuminate large area of it to cure or pre-cure the ink because they cannot cure the ink instantaneously. Reduction of the area where the web is contacting the magnetic cylinder 42 reduces a time required for a proper alignment of magnetic flakes. In accordance with an embodiment of this invention, we found, that it was beneficial to use a high power UV laser so as to illuminate the narrow region on the end of the quadrant of the magnetic cylinder. In this regard, the laser 50 is provided to produce the light beam 51 to the quartz cylindrical lens 52 installed across the substrate 42. The lens converges the laser beam and generates the cross-web light flow 53 falling on the web 52 as the narrow line 54 of an intense UV light for curing the magnetic ink without distortion of the "rolling bar" effect. The "rolling bar" in this instance is merely exemplary. Providing a curing narrow line laser light, for example, a line having width of less than one inch and a width of many times greater, conveniently positioned to irradiate the moving substrate though a narrow line or window opening would allow curing within the magnetic field other magnetically alignments of flakes produce by other magnetic arrangements.

For practical applications using UV curable binder commercially available we suggest using a laser in the wavelength range of 325 nm to 425 nm, and preferably in the range of 355 nm to 405 nm and wherein said laser has a power in the range of 100 mW to 2000 mW.

The power of the laser depends very much upon the speed at which the substrate is moving and the distance the laser is from the substrate. For example, if the substrate is moving more slowly, less power is required from the laser as the region being irradiated with experience the beam for a longer duration. Lasers in the wavelength ranges of 355 nm/349 nm and 405 nm are commercially available. We have also found re-focusable lasers to be very useful for curing wherein the lasers can be adjusted so that they do not provide a small dot, but rather a spot or line of 0.0625" to 0.375".

Figure 7:
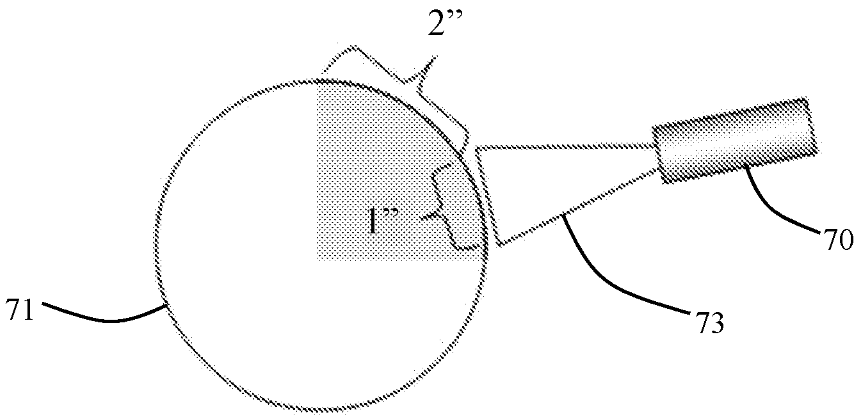
FIGS. 7 and 8 illustrate irradiating a beam in a restricted region of the substrate using a laser beam.
Figure 8:
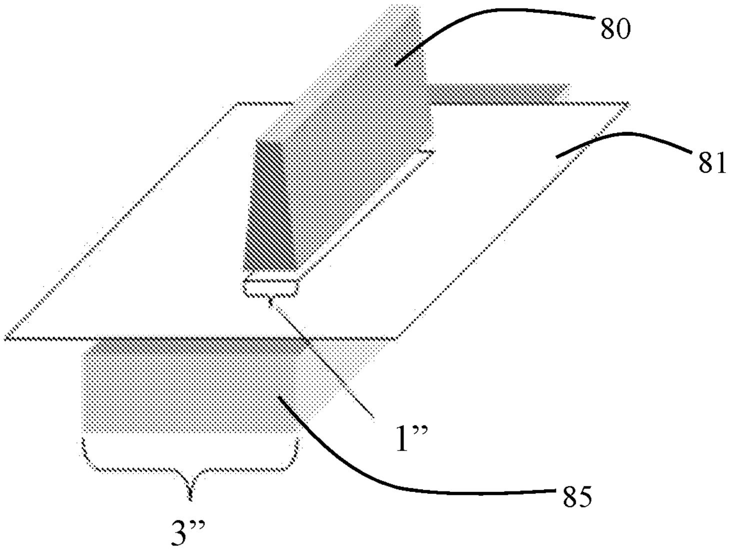

Referring to FIG. 7 a cylinder 71 is shown irradiated with a beam 73 of a laser 70. The grey magnetic region is shown to be 3 inches in width and the curing region adjacent the laser beam 71 is 1" in width. In FIG. 8 a substrate 81 is shown having a magnet 85 below having a width of 3" and a curing laser bar 80 above having a width of 1". The width is determined by the area of the contact of the substrate with the surface of the apparatus bearing embedded magnets. The curing region has to be not larger than one third of that area. In general the last ⅓ of the contact zone is preferably where curing occurs.

Figure 9:
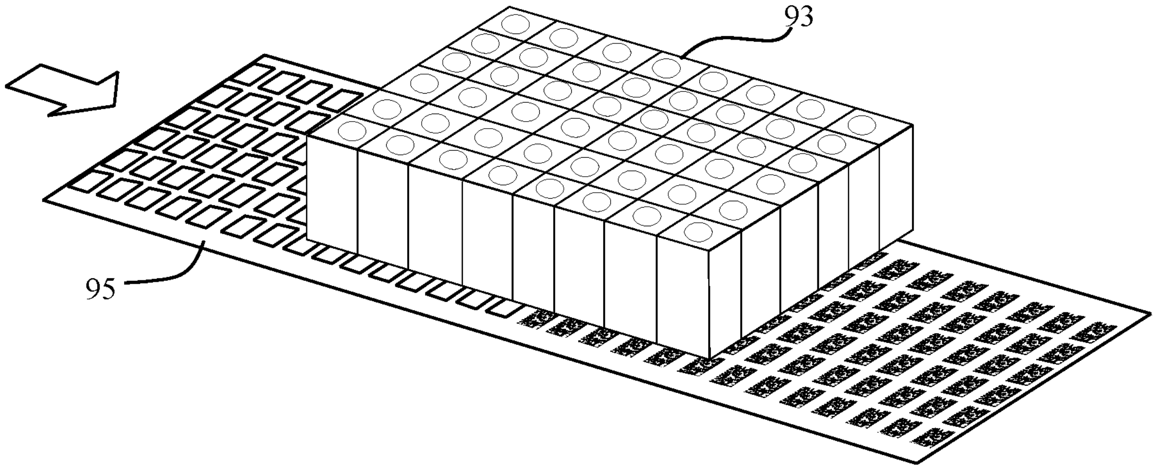
FIG. 9 is an illustration of a system wherein an n×m array of lasers provide a linear array of beams for irradiating regions on the moving substrate wherein the lasers can be controllably be switched on selectively.
Figure 10:
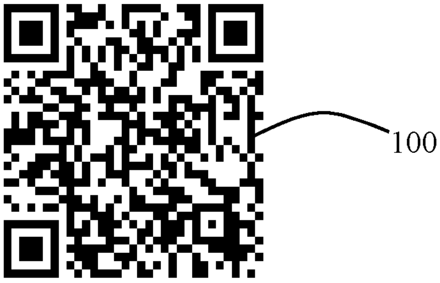
FIG. 10 is an illustration of a printed label using the lasers to fix magnetically aligned flakes in a predetermined pattern.

Referring now to FIG. 9, an alternative embodiment of the invention is shown wherein a 1×n linear array of lasers or n×n array 93 (as shown) of laser beams are provided which, when all switched on, irradiate locations forming a line across the substrate 95. Advantageously, the line is not a zigzag but is a straight line, and as the substrate moves; the lasers are controlled so as to be switched on, and off in a desired manner, an image is formed in the aligned flakes as the coating is cured to fix the flakes in the pattern. A dynamic, line-by-line curing is achieved as the substrate moves and the beams change their irradiating pattern by switching the laser within the array, dynamically. An example of an image 100 produced by the using a laser array is demonstrated in FIG. 10.

In alternative but related embodiment, a suitably programmed controller (not shown) controls the switching on and off of particular lasers within the array, so as to be able to change the image being "frozen" within the binder. For example if all of the flakes within a region are upstanding, and the array shown is programmed to irradiate a particular sub-region defining a desired image, a next label to be printed can have a different image by switching on and off different lasers in the array. This provides the ability to, for example cure flakes with an image of a serial number, and on a subsequent label cure a different serial number, such that individual labels can be printed with unique serial numbers, by varying the region of flakes to be cured accordingly. At a subsequent curing stage, the remaining flakes in the uncured binder can be oriented to be flat upon the substrate to provide contrast to the cured upstanding flakes. Heretofore, it was not possible to magnetize and cure images in this manner in a high-speed process.

Although some or all adjacent labels may have different visible images as a result of curing different regions of flakes or areas within the coated label region, the alignment of flakes and curing of flakes by the first laser curing station that corresponds to a same region on another label on moving web or substrate will have a same alignment.

In embodiments of this invention a UV laser has been used to cure flakes in a UV curable binder. Of course other laser wavelengths that are compatible with curing a particular binder having flakes therein can be used.

What is claimed is:

1. A system comprising:
magnetic assemblies to create a first magnetic field, wherein the magnetic assemblies include:
a first magnetic assembly that includes a north pole and a south pole, and
a second magnetic assembly;
a source to generate a beam that cures a region of a substrate by moving the beam back-and-forth across the region while the substrate is on a path associated with the magnetic assemblies; and
a magnet that is downstream from the magnetic assemblies and the source and is to create a second magnetic field that is different from the first magnetic field.

2. The system of claim 1,
wherein the first magnetic assembly is on a first side of the path, and
wherein the second magnetic assembly is on a second side of the path.

3. The system of claim 1, wherein the region of the substrate is cured while the substrate is moving on the path.

4. The system of claim 1, wherein a first polarity of the first magnetic assembly is different from a second polarity of the magnet.

5. The system of claim 1, wherein a first polarity of the first magnetic assembly is different from a second polarity of the second magnetic assembly.

6. The system of claim 1, wherein the first magnetic field is between the first magnetic assembly and the second magnetic assembly.

7. The system of claim 1, wherein the path is between the first magnetic assembly and the second magnetic assembly.

8. The system of claim 1, wherein the magnet is under the path.

9. A method comprising:
moving a substrate along a path that is associated with magnetic assemblies that create a first magnetic field and a magnet that creates a second magnetic field that is different from the first magnetic field,
wherein the magnetic assemblies include:
a first magnetic assembly that includes a north pole and a south pole, and
a second magnetic assembly;
using a source to generate a beam; and
curing a sub-region of the substrate by moving the beam back-and-forth across the sub-region while the substrate is moving along the path,
wherein the magnet is downstream from the magnetic assemblies and the source.

10. The method of claim 9, wherein curing the sub-region of the substrate comprises:
moving the beam between the first magnetic assembly and the second magnetic assembly.

11. The method of claim 9,
wherein the first magnetic assembly is on a first side of the path, and
wherein the second magnetic assembly is on a second side of the path.

12. The method of claim 9, wherein curing the sub-region of the substrate comprises
moving the beam in a direction perpendicular to a movement of the substrate.

13. The method of claim 9, wherein the beam is an ultra-violet (UV) laser beam.

14. The method of claim 9, wherein moving the substrate along the path comprises:
moving the substrate along a portion, associated with the first magnetic field, of the path at speeds of 25 feet/minute to 400 feet/minute.

15. The method of claim 9, wherein the first magnetic assembly includes a permanent magnet.

16. The method of claim 9, further comprising:
orienting magnetic platelets of pigment, on the sub-region of the substrate, along magnetic lines of the first magnetic field.

17. The method of claim 9, wherein curing the sub-region of the substrate comprises:
controlling, using a computer linked to a printing press that includes the path, moving of the beam back-and-forth across the sub-region of the substrate.

18. The method of claim 9,
wherein curing the sub-region of the substrate comprises:
curing the sub-region of the substrate in a manner that forms an insignia, and wherein the method further comprises:
curing, after forming the insignia, the sub-region of the substrate using a ray of ultra-violet (UV) from a UV lamp.

19. An apparatus, comprising:
means for moving a substrate along a path that is associated with magnetic assemblies that create a first magnetic field and a magnet that creates a second magnetic field that is different from the first magnetic field,
wherein the magnetic assemblies include:
a first magnetic assembly that includes a north pole and a south pole, and
a second magnetic assembly;
means for using a source to generate a beam; and
means for curing a sub-region of the substrate by moving the beam back-and-forth across the sub-region while the substrate is moving along the path,
wherein the magnet is downstream from the magnetic assemblies and the source.

* * * * *